Sept. 15, 1964 J. D. FREEMAN 3,149,324

CHANGEABLE PLURAL DIGIT PULSE ENCODER

Filed Nov. 16, 1961 3 Sheets-Sheet 1

INVENTOR.
JOHN D. FREEMAN

BY [signature]

ATTYS.

CHANGEABLE PLURAL DIGIT PULSE ENCODER

Filed Nov. 16, 1961 3 Sheets-Sheet 2

INVENTOR.
JOHN D. FREEMAN
BY
ATTYS.

CHANGEABLE PLURAL DIGIT PULSE ENCODER

Filed Nov. 16, 1961 3 Sheets-Sheet 3

INVENTOR.
JOHN D. FREEMAN
BY [signature]
ATTYS.

United States Patent Office 3,149,324 Patented Sept. 15, 1964

3,149,324

CHANGEABLE PLURAL DIGIT PULSE ENCODER

John D. Freeman, Westport, Conn., assignor to General Time Corporation, New York, N.Y., a corporation of Delaware Filed Nov. 16, 1961, Ser. No. 152,779
14 Claims. (Cl. 340—348)

The present invention relates to the field of electronic computation and control and more particularly to a device for producing serial groups of decimally coded pulses.

It is an object of the present invention to provide an improved coding device for producing groups of decimally coded pulses which is accurate and reliable and which may be used with a wide variety of associated equipment.

It is another object of the present invention to provide a pulse encoder which is flexible in application and operation and which is capable of operating over a wide range of speed and substantially independently of the shape, duration or spacing of the input pulses. Thus the device may be used to respond to pulses which are widely and irregularly spaced or to respond to regularly spaced pulses at high repetitive rates on the order of 20 kilocycles or above.

It is a further object of the present invention to provide a coding device which is simple and compact and which operates on extremely small amounts of power, particularly under stand-by conditions, making the device in certain of its aspects well suited for incorporation in satellites or other remote apparatus where power is at a premium.

It is an object to provide a coding device which may be easily extended to as many decimal places as desired simply by plugging in additional stages and without modification of the basic circuitry.

In one of its aspects it is an object to produce a pulse encoder which may normally be employed for single transfer of data, for example, into a storage register, but which may be used, if desired and without modification, for producing an automatically repeated output at a high repetitive rate for visual display on an oscilloscope or the like.

It is one of the central objects of the present invention to provide a coding device which makes novel use of a magnetic counter of the type employing a saturable reactor advanced from negative to positive saturation in accordance with the cumulative energy content of the pulses supplied to it.

Other objects and advantages of the invention will become apparent upon reading the following detailed description and upon reference to the drawings, in which:

FIGURE 1 is a block diagram of a decimal coding device constructed in accordance with the present invention.

FIGS. 2 and 2*a* comprise a circuit diagram of the device disclosed in FIG. 1.

Figures 1, 3, 4:
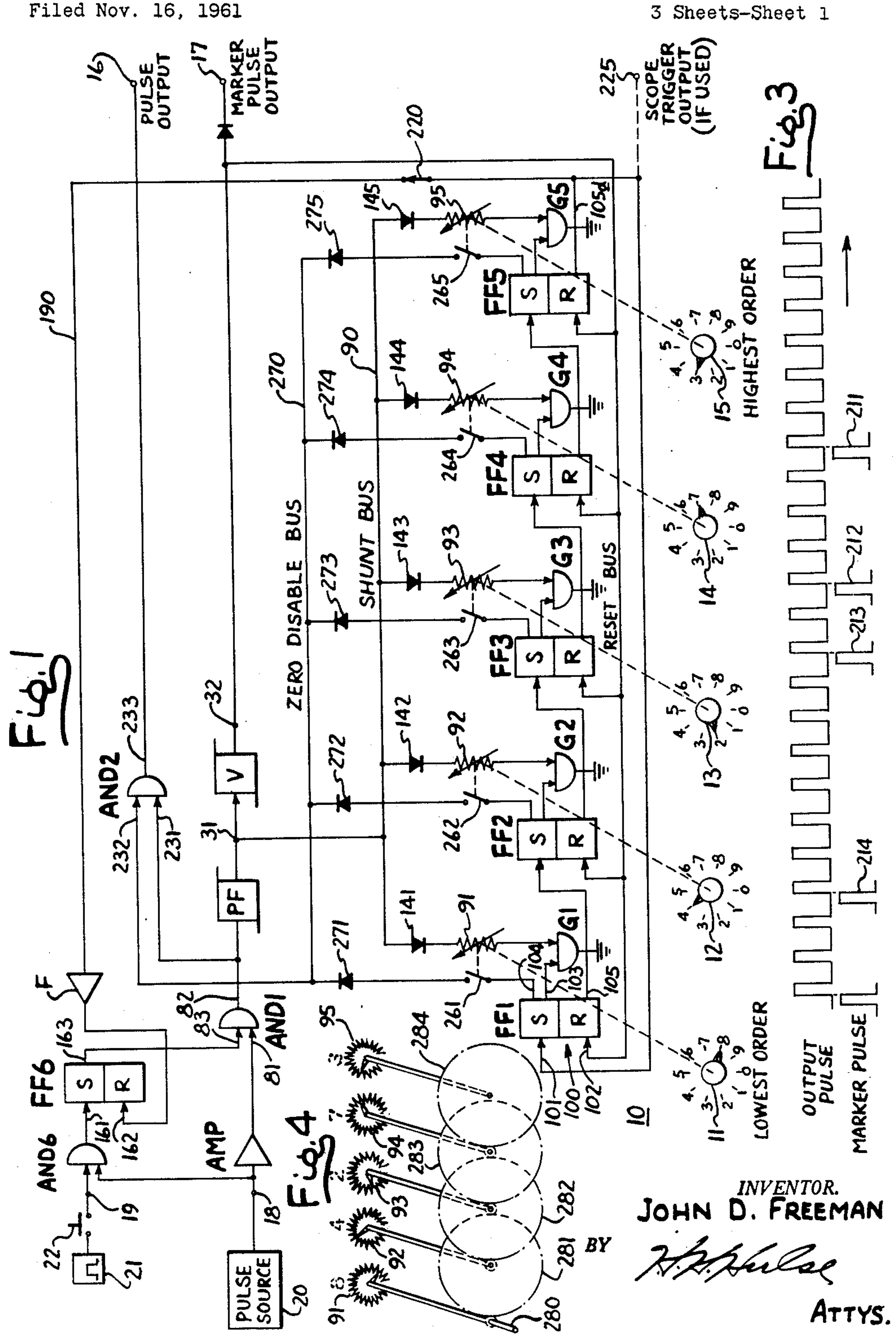
FIG. 3 shows the pulses at the output terminals of the device for an assumed setting of the reference resistors.
FIG. 4 is a diagram showing the nature of the modification required to convert the device to an analog-to-digital computer.

While the invention has been described in connection with a preferred embodiment, it will be apparent to one skilled in the art that the invention is not limited to the particular embodiment but, on the contrary, I intend to cover the alternative and equivalent arrangements included within the spirit and scope of the appended claims.

Turning now to the drawings, a coding device 10 is disclosed having settable control elements in the form of calibrated knobs 11, 12, 13, 14 and 15. The number which is to be coded is set up on the knobs with the result that successive decimally coded pulse groups appear at a pulse output terminal 16, with the groups being separated by marker pulses appearing at a marker pulse output terminal 17. For the purpose of supplying the coding device with a repetitive train of input pulses, an input terminal 18 is provided connected to a source of pulses 20 which may produce pulses over a wide range of speed. Operation is initiated by applying a command pulse to a command pulse terminal 19. The command pulse may be derived from any suitable source diagrammatically indicated at 21, with a pushbutton or other momentary contact device 22 connected in series therewith.

Briefly stated, the operation is such that when a decimal number is set up on the knobs 11–15 order by order and the pushbutton 22 depressed to initiate the operation, pulses appear in successive groups or trains at the output terminal 16, with the number of pulses in each train corresponding, order by order, with the value of the decimal digits and with the individual groups being separated by marker pulses appearing at the terminal 17.

In accordance with the present invention the output pulses are counted by a magnetic counter the count of which is controlled by a reference element which is calibrated in terms of decimal digits and with the completion of count being signaled by a marker output pulse. In the present instance the counter, indicated at V, is of the type having an input terminal and an output terminal and including a saturable reactor which is advanced toward positive saturation step by step in accordance with the cumulative energy content of pulses received at the input terminal and which has provision for resetting to the condition of negative saturation accompanied by the production of a pulse at the output terminal when positive saturation is exceeded. The reference element which is used in the presence instance for controlling the total count is in the form of a shunt resistor shunted across the counter input terminals for the purpose of diverting a predetermined portion of the energy of the input pulses to ground thereby to vary the count. Thus when a high count is desired, for example, nine, a low value resistor is used so that most of the input energy is diverted to ground and so that nine input pulses are required to convert the counter from one condition of saturation to the other. Conversely, when a low count is desired, for example, one, a high value shunt resistor is used so that a single input pulse suffices to drive the counter beyond the condition of positive saturation for resetting the same.

Magnetic counters suitable for use in the present circuit are commercially available under the trade name "Incremag" and are described in detail in Neitzert Patent 2,897,380 to which reference is made for the details of construction and operation. Suffice to say that the counter V has an input terminal 31, an output terminal 32, and a ground terminal 33. Power is supplied to the counter through a terminal 34 connected to a power supply bus 35. The heart of the counter is a saturable reactor 40 having an input winding 41, an output winding 42 and a triggering winding 43. A transistor 44 has its input circuit connected across the triggering winding and has its output circuit connected in series with the output winding 42. The material of the core is so chosen that when an input pulse is applied to the input winding, the magnetization of the core is advanced one step from negative saturation toward the condition of positive saturation.

The number of pulses required for positive saturation depends upon the cumulative energy content of the input pulses which in turn depends upon the value of the shunt resistance shunted across the input terminal 31. When the device is set for a count of nine, the eighth pulse is effective to produce a condition of near saturation. The nine pulse causes the knee of the saturation curve to be exceeded, and, when such pulse is removed, the sudden collapse of the excess flux induces a voltage in the triggering winding 43 which is in a direction to initiate conduction in the transistor 44. The resulting flow of current in the output winding 42 not only produces an output pulse at the output terminal 32, but induces a voltage in the triggering winding 43 which causes still further current to flow through the transistor output circuit to the point where a condition of negative saturation is achieved in the core of the reactor. This restores the device to its initial state in readiness to receive a new series of pulses. To prevent operation of the transistor 44 in response to the small changes in flux which occur during each step of advancement toward saturation, a damping resistor 45 is placed in parallel with the output winding 42. Moreover, to limit the base current of the transistor in the face of a large voltage induced in the triggering winding a series resistor 46 is used. Finally there is provided in series with the collector of the transistor 44 a low value resistor 47 for the purpose of limiting the reset current, which not only tends to protect the transistor but which also limits the load which is placed upon the power supply bus 35.

For the purpose of supplying input pulses to the magnetic counter which are of consistent energy content, a pulse former PF is interposed in the circuit ahead of the magnetic counter. This pulse former is also constructed in accordance with the teachings of the above Neitzert patent and the circuit corresponds. The circuit of the pulse former PF corresponds closely to the circuit of the counter just described. That is, there is provided a saturable reactor 50 having an input winding 51, an output winding 52, and a triggering winding 53. When saturation of the core is exceeded, the voltage induced in the triggering winding 53 triggers a transistor 54 so that current flows through the output winding 52 and through the input winding 41 of the counter stage. A damping resistor 55 is arranged in parallel with the output winding, base current is limited by a series resistor 56, and current in the output circuit is limited by a series resistor 57. To improve the consistency of the input pulses applied to the pulse former, an input or buffer stage 60 is included in the pulse former made up of transistor 61, an input resistor 62 and a diode 63. The diode makes the circuit responsive only to the positive portion of the input pulse, with the negative portion simply being shorted to ground. The current which flows through the output circuit of the transistor 61 when the core is saturated is limited by a series resistor 64.

For the purpose of receiving the repetitive input pulses received at the terminal 18 and for gating the pulses to the pulse former and to the pulse output terminal 16, an "and" gate AND–1 is provided having an emitter-follower AMP. The latter, which permits the pulse source to be of high impedance, includes a transistor 71 having an input resistor 72 and a load resistor 73. Connected across the transistor input is a diode 74 to protect the transistor from the positive portion of the input pulse. The gate AND–1 has an input terminal 81, an output terminal 82 and a control terminal 83. The gate is extremely simple consisting of a transistor 85 having a resistor 86 in series with the control terminal. As shown in the drawing, the repetitive pulses from the terminal 18 following amplification are fed simultaneously to the pulse former PF and to the pulse output terminal 16. The output pulse from the counter V which occurs under the condition of positive saturation is fed to the marker output terminal 17, the latter having a series diode 87 and output resistor 88. Accordingly, the operation of the device as thus far described is as follows: The train of input pulses from the terminal 18 is fed to the pulse output terminal 16 and, simultaneously, to the input terminal 31 of the counter V. After a predetermined number of pulses is received by the counter, which depends upon the value of the shunt resistance at the input, a marker pulse appears at the output terminal 17 for the purpose of defining the end of the initial pulse train.

In accordance with the present invention a series of reference resistors are provided which are selectively connectable in shunt with the input terminal of the counting device thereby to vary the count together with a counting ring for commutating each of the reference resistors successively into active shunting position, order by order, for production of successive groups of coded output pulses at the output terminal. In the present instance the reference resistors indicated at 91–95 respectively are connected to a shunt bus 90 which in turn is connected to the input terminal 31 of the counter. The counting ring which is employed to commutate the reference resistors into active position and which is generally indicated at 100 includes flip-flop devices FF1–FF5 inclusive.

Taking the flip-flop device FF1 as representative, it includes a set input terminal 101, a reset input terminal 102, a set output terminal 103, an auxiliary set output terminal 104, and a reset output terminal 105. Supplying the set input terminal 101 is a capacitor 106. The reset input terminal 102 is supplied from a reset bus 107. While the present invention is not limited to use with any particular flip-flop circuit, the disclosed circuit possesses a number of advantages in this environment and hence is preferred. It is of the type in which both legs of the circuit are simultaneously conductive when the circuit is "set" and simultaneously non-conductive when the circuit is "reset." Thus there is provided in the left hand leg of the circuit a transistor 111 and in the right hand leg a transistor 112. These are of the PNP and NPN types respectively and should be of the type having extremely low leakage current. Connected in the output circuit of the transistor 111 is a load resistor consisting of two series sections 113, 114, the junction of which is connected to the output terminal 103. The transistor 112 has a load resistor 115. For the purpose of cross-coupling the output circuit of the transistor 111 to the input circuit of the transistor 112, a voltage divider is provided consisting of series connected resistors 116, 117. Similarly for coupling the output of the transistor 112 to the input of transistor 111 a voltage divider is provided made of up resistors 118, 119. The cross connections are indicated at 121, 122.

For the purpose of resetting the flip-flop device FF1, i.e., for rendering it non-conductive, the emitter terminal of the transistor 112 is connected to ground through a low value resistor 125 and means are provided for momentarily applying to the reset bus 107, which is connected to the ungrounded end of the resistor, a positive reset pulse which renders the transistor 112 momentarily non-conducting. In the present instance the resetting pulse is derived from the output of the counter so that the one of the flip-flop devices which is set or conducting is rendered non-conducting when the counter reaches the end of its count. To produce a positive reset pulse of a reliably high level, the output signal from the counter is differentiated by a series capacitor 126 and resistor 127 and the resulting positive peak is selectively passed by a series diode 128 which is interposed between the capacitor and the reset bus 107.

The operation of the flip-flop device FF1 will be apparent to one skilled in the art and may be reviewed as follows. It will be assumed at the outset that the flip-flop device is non-conducting. A positive input pulse appearing at input terminal 101 causes the transistor 112 to begin to conduct. This produces a voltage at the cross connection 121 that is negative with respect to the emitter of transistor 111 which causes conduction to begin in the latter. This in turn produces a positive-going voltage on the cross connection 122 augmenting conduction in the transistor 112. The effect of the cross connections is regenerative so that, once triggered by an input pulse at terminal 101, both legs of the flip-flop device become instantly saturated producing a positive step change in voltage at the output terminals 103, 104. Conversely, when a positive pulse is applied to the reset input terminal 102, this tends to buck the flow of current in the transistor 112, the decrease in current resulting in a positive-going voltage on the cross connection 121 which reduces flow of current in the transistor 111. This is reflected in a less positive voltage at the cross connection 122 causing a further reduction in the flow of current in the transistor 112. Again, the effect is regenerative so that conduction immediately ceases in both legs of the flip-flop circuit.

In carrying out the present invention, each of the flip-flop devices controls an associated grounding switch or gate for grounding the associated reference resistor when the device is set. Such grounding switches are indicated at G1–G5 respectively. Taking the switch G1 by way of example, it includes an input terminal 131, a ground terminal 132, and a control terminal 133, with the control terminal being connected to the output terminal 103 of the flip-flop device. In the illustrated grounding switch G1 a transistor 135 is used, with the collector being connected to the input terminal, the base to the control terminal, and with the emitter grounded. It will be apparent, then, that when the flip-flop device FF1 is set or conductive a voltage will be applied to the base terminal which is sufficiently positive, the transistor being of the NPN variety, so that the output circuit 131–132 of the transistor is of low resistance. In short, the reference resistor 91 is grounded and hence active as a shunting resistor for the counter whenever the flip-flop device FF1 is set.

The remaining flip-flop devices FF2–FF5 in the counting ring are identical to the flip-flop device FF1 already described and the grounding switches G2–G5 accordingly correspond to the grounding switch G1; hence corresponding reference numerals are employed where applicable. It will be noted that the reset output terminal of each of the flip-flop devices is coupled to the set input terminal of the next flip-flop in the series by a coupling capacitor. Thus when a reset pulse is applied to the reset bus 107, which is connected to all of the reset input terminals, the flip-flop device which is then conducting or set is rendered non-conducting or reset while all of the flip-flop devices which are non-conducting are unaffected. The act of resetting, however, produces a step change of voltage in the reset flip-flop device which produces a setting voltage at the set input terminal of the next device in the series. Therefore, each time a reset pulse is applied to the reset bus 107 stepping occurs from one flip-flop to the next. It follows, then, that the grounding switches G1–G5 are closed individually and in succession, successively shifting the settable reference resistors 91–95 into active shunting position relative to the input terminal 31 of counter V. Reverse current isolation is provided by including, in series with each of the reference resistors 91–95, a diode polarized forwardly toward ground as indicated at 141–145.

While the resistors 91–95 which determine the value of the count in each order have been indicated in FIG. 1 diagrammatically, such resistors are each preferably in the form of a tap switch 150 having calibrated resistors 151–159 inclusive, with each of the resistors being capable, when inserted into shunting position, of producing a count from 1 to 9 corresponding to the scale associated with the setting knobs 11–15.

Figure 2:
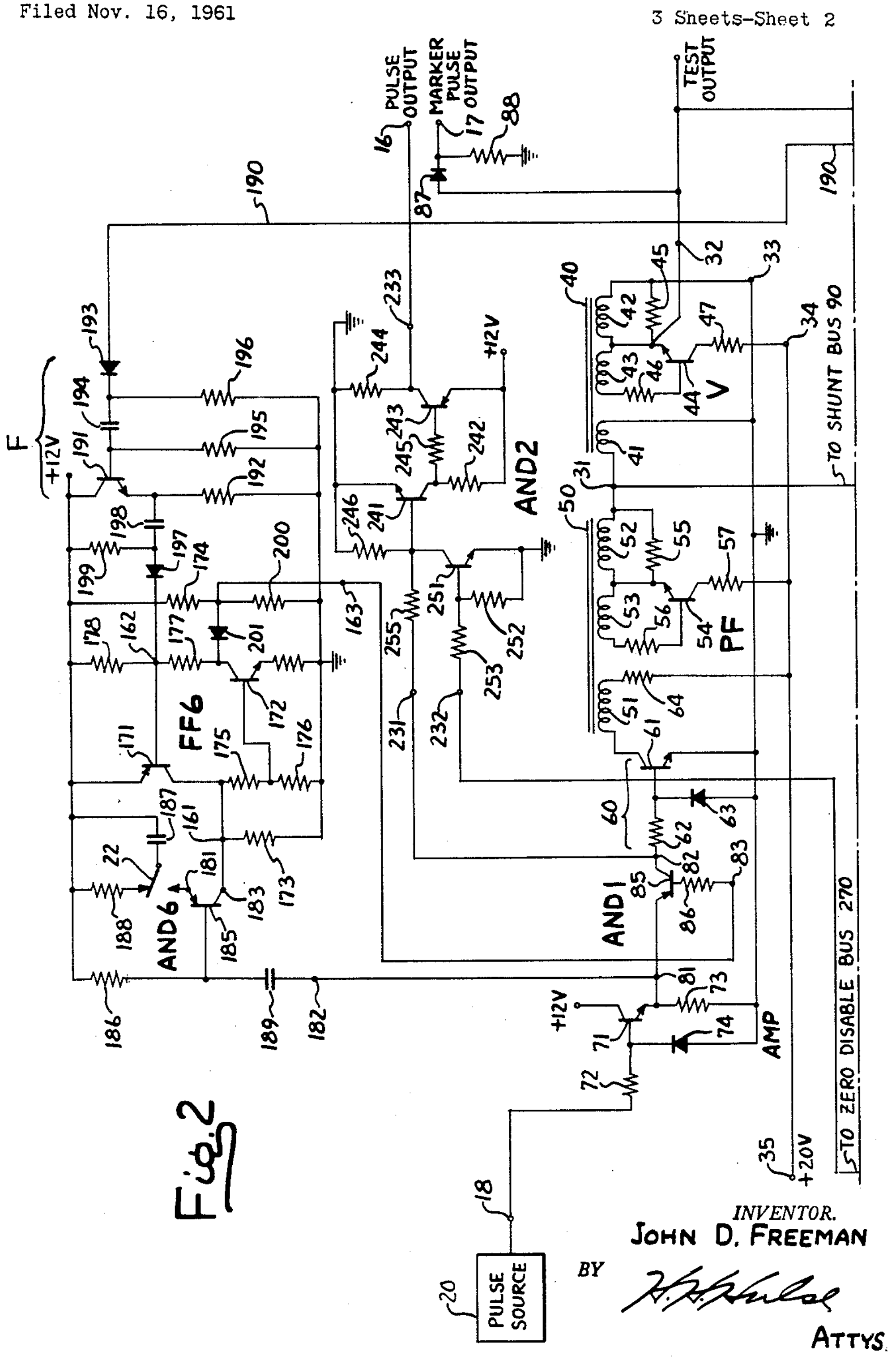
Figure 2A:
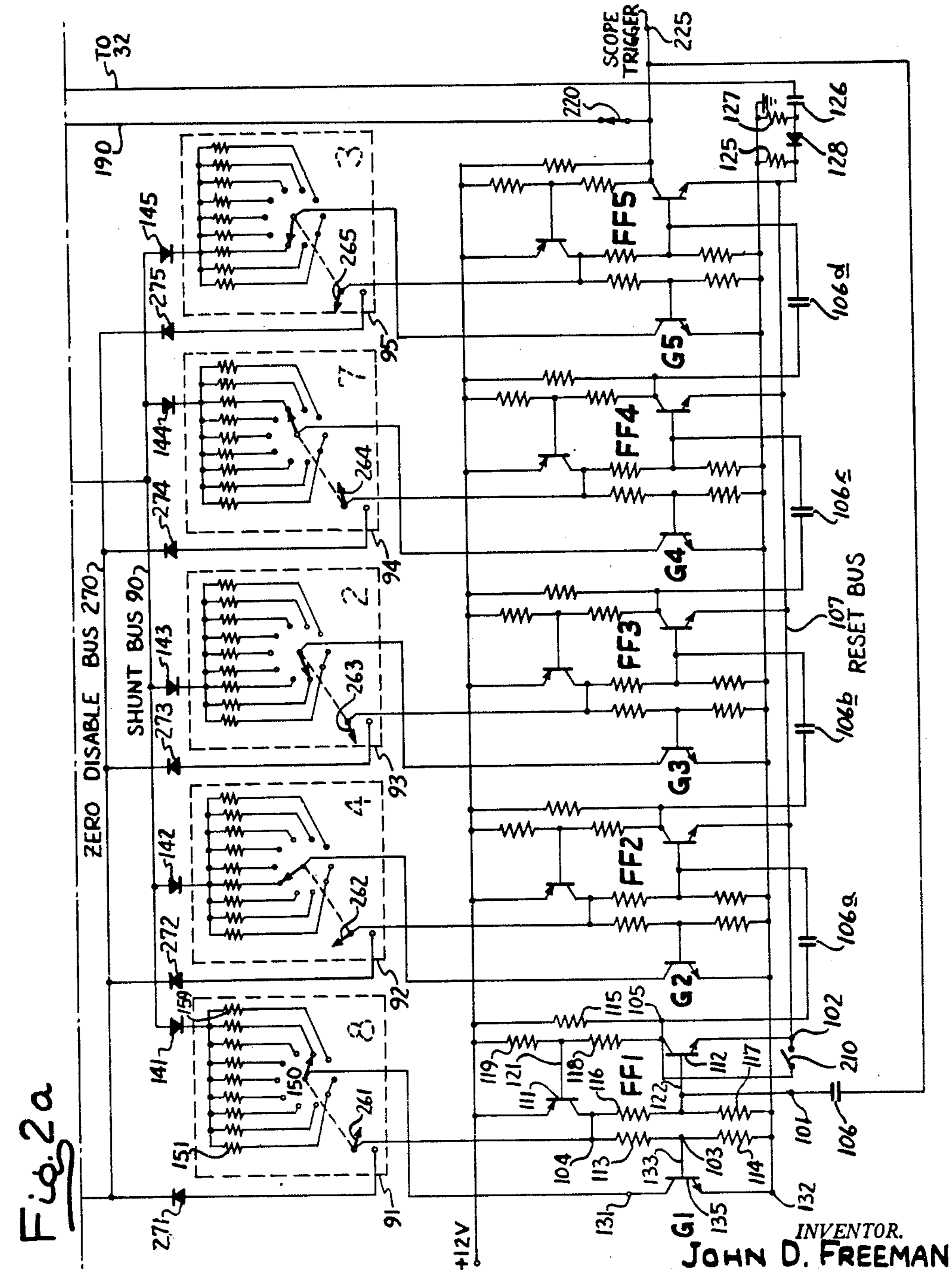

Prior to reviewing the function of the counting or commutating ring 100 in a practical case, reference may be made to one of the further features of the present invention, namely, the novel means provided for starting and stopping the operation of the ring and the feeding out of pulses from the pulse output terminal 16. Thus, means are provided for operating the "and" gate AND1, which feeds the pulse former PF and the pulse output terminal 16, so that the gate is turned on in response to an initiating command signal and turned off following a single cycle of commutation. In the present instance this is accomplished by a flip-flop FF6 having a set terminal 161, a reset terminal 162 and a set output terminal 163, with the latter being connected to the input terminal 83 of the gate AND1. Referring to FIG. 2, the flip-flop device will be seen to be similar in circuitry to the flip-flop device FF1 previously described. It includes a first transistor 171 and a second transistor 172 having load resistors 173, 174. A cross connection is provided from the first transistor to the second by a voltage divider consisting of resistors 175, 176, this function being performed in the case of the second transistor by a voltage divider 177, 178. In order to insure that a complete operating pulse is applied to the pulse former PF and thus to counter V, "and" gate AND6 is provided having input terminals 181, 182 and output terminal 183. This "and" gate includes a transistor 185 which shares load resistor 173 with the transistor 171 in the flip-flop device. The transistor has its base normally biased positive by a resistor 186 which is connected to the positive voltage supply. The command pushbutton 22, previously referred to, is connected in the emitter circuit of the transistor 185 and includes a series capacitor 187. Means are provided for discharging the capacitor when the pushbutton is released in the form of a discharging resistor 188. A capacitor 189 is connected in series with the input terminal 182.

It will be apparent to one skilled in the art that two conditions must be satisfied for the "and" gate to set the flip-flop device FF6 or make it conducting, the pushbutton must be pressed and the transistor base must be made negative by the fall of a pulse derived from the amplifier AMP. Thus assuming that the pushbutton 122 is pressed, the emitter circuit is completed through the capacitor 187. When an incoming, positive, square wave pulse from the amplifier AMP, received through terminal 182, is differentiated by the capacitor 189, the resulting negative spike occurring at the fall of this pulse overcomes the positive bias and biases the transistor for momentary conduction. Such conduction causes the input terminal 161 of the flip-flop device to swing in the positive direction causing a corresponding positive swing at the base of the transistor 172 so that conduction is initiated in this transistor. Because of the regenerative action, conduction in the load circuit of the transistor 172 causes a voltage to appear at the base of the transistor 171 that is negative with respect to its emitter which renders this transistor conductive so that the flip-flop device as a whole conducts.

As a result of the conduction the output terminal 163 of the flip-flop device swings negative placing negative bias on the input terminal 83 of the gate AND1. Such gate is thus rendered conductive so that input pulses are free to pass from the amplifier AMP into the pulse former and also to the output pulse terminal 16.

In carrying out the invention, means are provide for resetting the flip-flop device FF6 upon completion of one complete cycle of commutation. This is accomplished by providing a connection from the output terminal 105*d* of the final flip-flop device in the commutating ring to the reset input terminal 162 of the flip-flop device FF6 via a line 190. In order to amplify the reset signal before it is applied to the flip-flop, a follower stage F is provided. This follower stage includes a transistor 191 having a load resistor 192. To select only the positive portion of the input pulse for application to the control terminal of the transistor 191, a directional differentiating network is provided at the input consisting of a diode 193 and a differentiating capacitor 194 having network resistors 195, 196. Similarly, a directional differentiating network is provided at the output of the transistor comprising a diode 197, a differentiating capacitor 198 and a resistor 199.

In operation, when a step change occurs in the output of the flip-flop device FF5 as a result of its resetting and at the end of a commutation cycle, a positive voltage is applied to the base of the follower transistor 191 causing it to become conductive. The output signal is differentiated by the capacitor 198 and the positive peak flowing through the diode 197 is applied to the input terminal 162 which is connected to the base of the transistor 171. Such positive bias causes a decrease in the current flowing through the transistor 171 which, because of the cross connection, results in a decrease in the current in the second leg of the circuit transistor 172 so that the entire flip-flop device becomes non-conductive. A resistor 200 is provided in series with the load resistor 174 and an isolating diode 201 is connected in series with the load circuit. Thus when the flip-flop device is non-conducting, the output voltage at terminal 163 swings more positive. Such voltage applied to the base terminal of the transistor in the gate AND1 turns off the gate and prevents any further flow of pulses.

The "and" circuit AND6 insures that AND1 shall be made conducting when the trailing edge of an input pulse has been received. Thus, regardless of when switch 22 is closed to initiate a series of coded pulses, AND1 will be turned on in time to receive a full input pulse. It is a further function of AND6 to insure that regardless of how long switch 22 is held closed, the system will only provide one series of coded pulses. If, for example, the input pulse repetition rate is 20 kilocycles, a single series of coded pulses will be completed in a minimum of 250 microseconds. Although switch 22 is held closed for longer than this interval, FF6 will be turned off and will remain off at the end of the pulse series. This is made possible by the fact that capacitor 187 is changed in a time less than 250 microseconds and therefore FF6 is not retriggered.

The operation of the circuit in its present embodiment will be made clear by considering a practical example. Suppose that the operation of auxiliary equipment fed by the output terminals 16, 17 requires the feeding of a decimally coded signal indicative of the decimal number 37,248 from low order to high. Such number is set up on knobs 11–15 (FIG. 1), with the knob 11 set to the digit of lowest order and the knob 15 set to the digit of highest order. It will be appreciated, of course, that the physical arrangement of the knobs 11–15 may be reversed from that shown so that the number will read from highest order from left to right, as is conventional. In any event, setting the knobs 11–15 appropriately adjusts the reference resistors 91–95. In order to insure that the counting ring is in correct initial position, i.e., with the flip-flop device FF1 set or conducting and with all of the rest non-conducting, a ring counter start switch 210 is provided having a direct connection to the load resistor 115. Closure of the switch places a positive voltage on the reset bus, turning off any of the flip-flop devices FF2–FF5 which may be conducting. Closing the switch also induces an artificial load in the right hand leg of the flip-flop device FF1 which, because of the cross connection 121, renders the left hand leg also conductive. After momentary contact of the switch 210 it may be released leaving the device FF1 set and the ring is then in proper phase for beginning the coding operation.

It may be noted that even without closure of switch 210, the desired initial condition (i.e., FF1 set, FF2, FF3, FF4 and FF5 reset) will exist normally. This is because at the completion of the commutating cycle FF5 is reset causing FF6 to reset and thereby stopping input pulses from further actuation of counter V. Resetting of FF5 also causes FF1 to be set by applying a positive-going voltage to capacitor 106. Thus switch 210 may be considered an optional addition to the circuit.

Command switch 22 is momentarily depressed turning gate AND 6 on so that the fall of the next pulse from the pulse source is effective to render the transistor in the gate conducting, setting the flip-flop device FF6. This causes the output terminal 163 of the flip-flop device FF6 to swing less positive. This turns the gate AND1 on so that pulses are free to flow both to the pulser former PF and to the pulse output terminal 16. For the time being it will be assumed that the AND gate 2 which is in series with the pulse output terminal 16 is in a conducting state.

Since the flip-flop device FF1 is set, the associated switch G1 is turned on connecting the reference resistor 91 in shunt between the input of the counter and ground. This effectively adjusts the counter to produce a count of eight, i.e., the eighth pulse received by the counter V is effective to exceed saturation of the core therein. At the end of the pulse the triggering voltage induced in the triggering winding by the excess flux causes the transistor in the counter to conduct so that the core is reset to a condition of negative saturation accompanied by production of an output pulse at the terminal 32. Such output pulse shows up at the marker output terminal 17 as indicated at 211 (FIG. 3) to define the first group of eight pulses. The output pulse from the counter, peaked by the differentiating capacitor 126, and with the positive peak selected by the diode 128, applies a momentary positive voltage to the reset bus 107 which applies resetting voltage simultaneously to all of the flip-flop devices. However, the only device affected by the reset voltage is device FF1 which is switched from conduction to non-conduction. This produces a positive-going voltage at the output terminal 105 of the flip-flop device which, coupled by capacitor **106*a* renders the next flip-flop device in the series, FF2, exclusively conducting. With FF2 set and FF1 reset, the switch G2 is turned on and the switch G1 is turned off so that reference resistor 92 is in active shunting position. The value of resistor 92 is such as to produce a count of four in the counter V. Consequently, after four pulses flow to the pulse output terminal 16, saturation is produced in the counter V producing a second marker pulse 212 and a second positive reset signal in the reset bus 107. This renders the flip-flop device FF2 non-conducting which causes the flip-flop device FF3 to conduct, effectively switching the third resistor 93 into active shunting position. Thus, after a count of two, a third marker pulse 213 is produced completing the third train of coded impulses. Following this, switching takes place in like manner to resistors 94, 95 producing seven pulses and three pulses respectively at the output terminal 16 separated by a marker pulse 214**.

When the final count of three is produced, followed by resetting of flip-flop device FF5, the output voltage appearing at **105*d* accomplishes two effects. In the first place it renders the flip-flop device FF1 conducting in readiness for an ensuing cycle. Secondly, such voltage acting through turn-off line 190 resets the flip-flop device FF6 turning off the gate AND1** so that no further pulses can flow. As a result, after the coded information is sent, the device turns itself off.

Where it is desired to provide repetitive recycling output for display on an oscilloscope or for a similar purpose, the turn-off line 190 may be opened. This may be accomplished by a normally closed switch 220 interposed in the line. With this line open it will be apparent that flip-flop device FF6 will not be reset at the end of a cycle of commutation but will remain set so that the gate AND1 remains turned on to recycle the system at a high repetitive rate. When this is done an auxiliary output terminal 225 may be provided for connection to the oscilloscope sweep circuit so that the coded signal will be displayed with the digits in proper order.

In the above discussion it has been assumed that the decimal number to be coded consists of decimal digits ranging from one to nine in each order. It is one of the features of the present device that a reliable count of zero may be secured in any one of the decimal orders where desired. Thus in accordance with the invention, means are provided for positively turning off the pulse output terminal 16 in any order where a decimal digit of zero appears so that pulses are positively prevented from showing up at the output between the marker pulses which define the order. This is accomplished in the present instance by providing switches associated with the respective settable reference resistors so that, in the zero position of the associated control knob, the switch is closed making the associated flip-flop device effective to turn off the gate AND2 which feeds the pulse output terminal.

Referring to the drawing the gate AND2 has an input terminal 231, a control terminal 232, and an output terminal 233. The gate acts both as a switch and as an amplifier. For amplification the gate includes a first transistor 241 having a load resistor 242 and a second transistor 243 having a load resistor 244, the output of the first transistor being connected to the input of the second by a coupling resistor 245. The transistor 241 has a bias resistor 246 for conduction upon receipt of input pulses via the output terminal 231 from the gate AND1. Means are, however, provided for effectively shorting out the signal to transistor 241 during the duration of a positive input signal at the control terminal 232. This short circuiting is effected by a transistor 251 which is connected to ground and which has a bias resistor 252 and an input resistor 253. A positive voltage at the control terminal 232 renders the transistor conductive, effectively grounding the input to transistor 241 and with the incoming signal at terminal 231 being dissipated by a load resistor 255. In order to turn off the AND gate to represent a decimal zero in any order, switches respectively indicated at 261–265 are all connected to a "zero disable" bus 270 through isolating diodes 271–275 and with the bus being connected to the control terminal 232 of the gate.

In operation, suppose that the decimal digits of lowest order and second lowest order are both zero. Under such circumstances the switches 261, 262 in these positions will be closed. This produces a positive voltage at the control terminal 232 so that the pulses supplied to the input terminal 231 of the gate AND2 are effectively shorted out. However, pulses continue to flow through the pulse former and into the counter. When saturation is achieved in the counter, the output signal therefrom results in a marker pulse which signifies the end of the lowest order and which commutates the counting ring so that the second flip-flop device is set. With the switch 262 associated therewith closed, the gate AND2 will again be turned off so that no pulses will appear at the output terminal 16 and, when saturation is achieved in the counter V, a second marker pulse will denote the end of the second order. From this point on the operation will take up as previously described. In order to shorten the zero interval for highest possible output speed, the reference resistors should preferably be constructed so that when their associated switches are closed they have a high resistance so that minimum energy will be shunted from the input terminal 31 of the counter. Under such conditions a single pulse from the pulse former is sufficient to achieve saturation of the counter. Thus, in effect, for the zero condition the counter becomes a "one counter" but with the pulse corresponding to the one count being disabled from appearing at the output terminal.

The present device, as will be apparent from the foregoing, provides a coded pulse source which is usable as a building block with many different types of computing and control apparatus, wherever a decimally coded pulse train is required. It is one of the features of the device that it may be operated at almost any speed which may be encountered in computer or control practice. At the lower extreme the pulse source is capable of accurate response to pulses which occur at widely spaced or irregular intervals and of any duration or wave form within broad limits. At the high end, the device is capable of responding accurately to pulses received at a high repetitive rate, for example, twenty kilocycles up to, say, 100 kilocycles.

All of the components, including the pulse former and counter, are of a type commercially available so that the system may be constructed entirely of components of proven reliability.

Since stand-by power requirements are extremely low, and since the device is simple and readily miniaturized, the circuitry is well suited for use in satellites or airborne equipment.

While the device has been described in its simplest aspect as an encoder having manually settable reference elements, it is not limited to such usage but may be employed as a transducer for telemetering of physical conditions. That is to say, instead of the resistors 91–95 being connected to manual control knobs they may be made responsive to physical position, temperature, pressure, or the like. Thus each decimal order of the output signal may be used to signify the magnitude of a variable. Any desired accuracy may be achieved simply by combining adjacent stages. Referring to FIG. 4, there is shown diagrammatically an arrangement in which position, in the form of rotation of an input shaft, is transduced to the form of a highly accurate output signal. Here the input shaft, indicated at 280, directly controls the reference resistor 91 in the lowest order. The succeeding higher order stages are controlled by progressive 10:1 stages of stepdown gearing indicated at 281, 282, 283, 284. With the system set up as shown, the output signal will be the same as that set forth at FIG. 3 and will represent a total of 3,724.8 revolutions of the input shaft 280.

Or, if desired, the input shaft 280 may be operated by a servomotor which is fed with an analog signal, enabling the device to be usefully employed as an analog-to-digital converter.

In the present embodiment the invention has been described in connection with a device providing five decimal orders. It will be apparent to one skilled in the art that the invention is not limited to any particular number of orders but additional stages may be added in the counting ring, together with associated switches and reference resistors, to satisfy any desired need. Moreover, it will be apparent that the device may be used for coding a signal to a base other than base ten if desired; hence the term "decimal" used in the claims is intended to be exemplary rather than limiting.

Separate terminals are provided for the pulse output and for the marker pulses. Both signals may be fed to a single output terminal provided they are distinguishable from one another, for example, by reason of differing amplitude, polarity, or width.

In the above discussion the device V has been referred to as a counter and, as such, accurate coding is achieved at the output terminals even though the pulses fed to the input terminal 18 are not in regular timed sequence. However, where the input pulses are in the form of timed clock pulses, the counting device V may be considered as a timer which produces marker pulses, for defining groups of output pulses, in accordance with timed intervals determined by the reference resistors 91–95 successively commutated into the circuit.

I claim as my invention:

1. In a coding device for producing groups of pulses corresponding in number respectively to a series of decimal digits, the combination comprising, a magnetic counting device having an input terminal and an output terminal and including a saturable reactor which is advanced step by step toward positive saturation in accordance with the cumulative energy content impulses received at the input terminal and which has provision for resetting to a condition of negative saturation automatically upon achieving a condition of a positive saturation accompanied by an output pulse at the counter output terminal, a source of successive pulses having predetermined individual energy content coupled to the input terminal of the counting device, a series of adjustable calibrated shunting resistors selectively connectable to the input terminal of the counting device for shunting off a portion of the energy content of the input pulses so that the counting device counts a number of pulses in accordance with the value of the acting shunting resistor, means coupled to the output of the counting device for commutating the resistors into active shunting position, output terminal means coupled to the pulse source and to the output of the counting device so that groups of pulses are produced at the output terminal means separated by marker pulses.

2. In a coding device for producing groups of pulses corresponding in number respectively to a series of decimal digits, the combination comprising, a magnetic counting device having an input terminal and an output terminal and including a saturable reactor which is advanced step by step toward positive saturation in accordance with the cumulative energy content impulses received at the input terminal and which has provision for resetting to a condition of negative saturation automatically upon achieving a condition of a positive saturation accompanied by an output pulse at the counter output terminal, a source of successive input pulses, means including a pulse former for converting the input pulses to consistent pulses having predetermined individual energy content for feeding to the input terminal of the counting device, a series of adjustable calibrated shunting resistors selectively connectable to the input terminal of the counting device for shunting off a portion of the energy content so that the counting device counts a number of pulses in accordance with the value of the active shunting resistor, and means coupled to the output of the counting device for commutating the resistors into active shunting position.

3. In a coding device for producing groups of impulses corresponding in number respectively to a series of decimal digits, the combination comprising a magnetic counting device having an input terminal and an output terminal and including a saturable reactor which is advanced to positive saturation step by step in accordance with the cumulative energy content of pulses received at the input terminal and which has provision for resetting to the condition of negative saturation accompanied by production of a pulse at the output terminal when saturation is achieved, means providing a train of input pulses connected to the input terminal of the counting device, means including a series of reference resistors selectively connectable in shunt with the input terminal of the counting device for varying the energy content of the pulses supplied to the latter thereby to vary the number of pulses required to convert the counting device from negative to positive saturation, a commutating ring for commutating each of the reference resistors successively into active position, said counting ring being coupled to the output terminal of the counting device, and means for effectively turning off the pulse source after a cycle of commutation has been completed.

4. In a coding device for producing groups of pulses corresponding in number to the respective digits of a series of decimal digits, the combination comprising a magnetic counting device having an input terminal and an output terminal and including a saturable reactor which is advanced to positive saturation step by step in accordance with the cumulative energy content of pulses received at the input terminal and which has provision for resetting to a condition of negative saturation automatically upon achieving a condition of positive saturation accompanied by an output pulse at the output terminal, a source of successive pulses having predetermined individual energy content coupled to the input terminal of the counting device, a series of adjustable calibrated shunting resistors selectively connectable to the input terminal of the counting device for shunting off a portion of the energy content of the input pulses so that the counting device is transformed from the condition of negative saturation to the condition of positive saturation upon receipt of a predetermined number of input pulses, said reference resistors being calibrated in terms of decimal digits so that the input pulses required for saturation correspond to the selected decimal digits, a counting ring for commutating from one reference resistor to the next, a pulse output terminal connected to the source of pulses, a marker pulse output terminal, the output terminal of said counting device being connected to the counting ring for stepping the same and being connected to the marker pulse output terminal to define groups of impulses at the pulse output terminal.

5. In a coding device for producing successive groups of pulses corresponding in number respectively to a series of decimal digits, the combination comprising a source of pulses, a pulse former for converting the pulses into pulses having uniform energy content, a counting device having an input terminal and an output terminal and capable of producing a signal at the output terminal upon receipt of pulses at the input terminal having a predetermined cumulative energy content, a plurality of resistors selectively connectable from the input terminal of the counting device to ground for shunting off a portion of the energy content of the pulses fed to the counting device, a counting ring having a plurality of switches connected in series with the reference resistors so that the resistors are commutated into active shunting position, output terminal means connected to the source of pulses and to the output of the counter so that pulses are produced on the output terminal means in successive groups and with the size of each group depending upon the magnitude of the reference resistor, and calibrated means for adjusting the magnitude of the reference resistors.

6. In a coding device for producing successive groups of pulses corresponding in number respectively to a series of decimal digits, the combination comprising a source of repetitive pulses, a magnetic counting device having an input terminal and an output terminal and capable of producing an output signal following the counting of a predetermined number of input pulses, a series of reference elements selectively connectable to the counting device to vary the count thereof, commutating means operable in a stepping fashion for connecting said reference elements to the counting device in succession, said commutating means being coupled to the output of said counting device for stepping to successively connect said reference elements to said counting device in response to the output signal therefrom, a pulse output terminal coupled to the pulse source, and a marker pulse output terminal connected to the output of the counting device for denoting separation of the output pulses into successive groups.

7. In a coding device for producing successive groups of pulses corresponding in number respectively to a series of decimal digits, the combination comprising a source of repetitive pulses, a counter having an input terminal and an output terminal and capable of producing an output signal following the counting of a predetermined number of input pulses, a series of reference elements selectively connectable to the counter to vary the count thereof, commutating means operable in a stepping fashion for connecting said reference elements to the counter in succession, said commutating means being coupled to the output of said counter for stepping to successively connect said reference elements to the counter in response to the output signal therefrom, and output terminal means coupled to the pulse source and to the output of the counter.

8. In a coding device for producing successive groups of pulses corresponding in number respectively to a series of decimal digits, the combination comprising a source of repetitive pulses, a magnetic counter having an input terminal and an output terminal and capable of producing an output signal following the counting of a predetermined number of input pulses, a series of settable reference elements calibrated in terms of decimal digits and selectively connectable to the counter to vary the count thereof, commutating means operable in a stepping fashion for connecting said reference elements to the counter in succession, said commutating means being coupled to the output of said counter for stepping to successively connect said reference elements to the counter in response to the output signal therefrom, output terminal means coupled to the pulse source and to the output of the counter, and control means movable into a first position for recycling of the commutating means and movable into a second position for terminating the output following a single cycle of commutation.

9. In a coding device for producing successive groups of pulses corresponding in number respectively to a series of decimal digits, the combination comprising a source of repetitive pulses, a magnetic counting device having an input terminal and an output terminal and capable of producing an output signal following the counting of a predetermined number of input pulses, a series of settable reference elements selectively connectable to the counter to vary the count thereof, a commutating ring for connecting said reference elements to the counter in succession, said commutating ring being coupled to the output of said counter for stepping of the ring in response to the output signal therefrom, output terminal means coupled to the pulse source and to the output of the counter for separation of the output pulses into successive groups, and means for initially setting the ring to place the first of the reference elements in active position.

10. In a coding device for producing successive groups of pulses corresponding in number respectively to a series of decimal digits, the combination comprising a source of repetitive pulses, a magnetic counting device having an input terminal and an output terminal and capable of producing an output signal following the counting of a predetermined number of input pulses, a series of settable reference elements selectively connectable to the counter to vary the count thereof, a commutating ring for connecting said reference elements to the counter in succession, said commutating ring being coupled to the output of said counter for stepping of the ring in response to the output signal therefrom, output terminal means coupled to the pulse source and to the output of the counter for separation of the output pulses into successive groups, a gate for controlling flow of the repetitive pulses, command means for turning on the gate, and means operated upon completion of a cycle of commutation for turning off the gate.

11. In a coding device for producing successive groups of pulses corresponding in number respectively to a series of decimal digits, the combination comprising a source of pulses, a counter having an input terminal and an output terminal and capable of producing an output signal when a predetermined count is achieved, a plurality of adjustable reference elements calibrated in terms of decimal digits selectively connectable to the counter for varying the count, means triggered by the output signal from the counter for successively commutating the reference elements into connection with the counter, output terminal means coupled to the pulse source and to the counter for producing pulses in successive groups and a gate interposed between the source and the pulse output terminal for temporarily disconnecting the pulse source from the terminal means when the reference element is adjusted to indicate a decimal digit of zero.

12. In a coding device for producing successive groups of pulses corresponding in number respectively to a series of decimal digits, the combination comprising a source of pulses, a counter having an input terminal and an output terminal and capable of producing an output signal when a predetermined count is achieved, a plurality of adjustable reference elements calibrated in terms of decimal digits and selectively connectable to the counter for varying the count, means triggered by the output signal from the counter for successively commutating the reference elements into connection with the counter, output terminal means connected to the pulse source and to the counter for producing groups of pulses separated by marker pulses, and means associated with each of said adjustable reference elements for temporarily disconnecting the pulse source from the terminal means when the reference element is adjusted to indicate a decimal digit of zero.

13. In a coding device for producing successive groups of pulses corresponding in number respectively to a series of decimal digits, the combination comprising a source of pulses, a counter having an input terminal and an output terminal and capable of producing an output signal when a predetermined count is achieved, a plurality of variable resistors calibrated in terms of decimal digits and selectively connectable to the counter for varying the count, means triggered by the output signal from the counter for successively commutating the resistors into connection with the counter, output terminal means connected to the pulse source and to the counter for producing separately defined groups of pulses each of said variable resistors having a switch operated in the zero position for disconnecting the pulse source from the terminal means when the associated reference element is commutated into active position.

14. In a coding device for producing groups of pulses corresponding in number respectively to a series of decimal digits, the combination comprising, a source of repetitive clock pulses, a pulse output terminal coupled to the source, a timer connected to the source and having an output terminal which produces a pulse to signify the end of the timed interval, said timer having a series of settable reference elements selectively connectable thereto for determining the length of the timed interval in accordance with the magnitude of successive decimal digits, commutating means operable in a stepping fashion for connecting the reference elements successively to the timer, said commutating means being coupled to timer output terminal for stepping to successively connect the reference elements to the timer in response to the timer output pulse.

No references cited.